Figure 1:
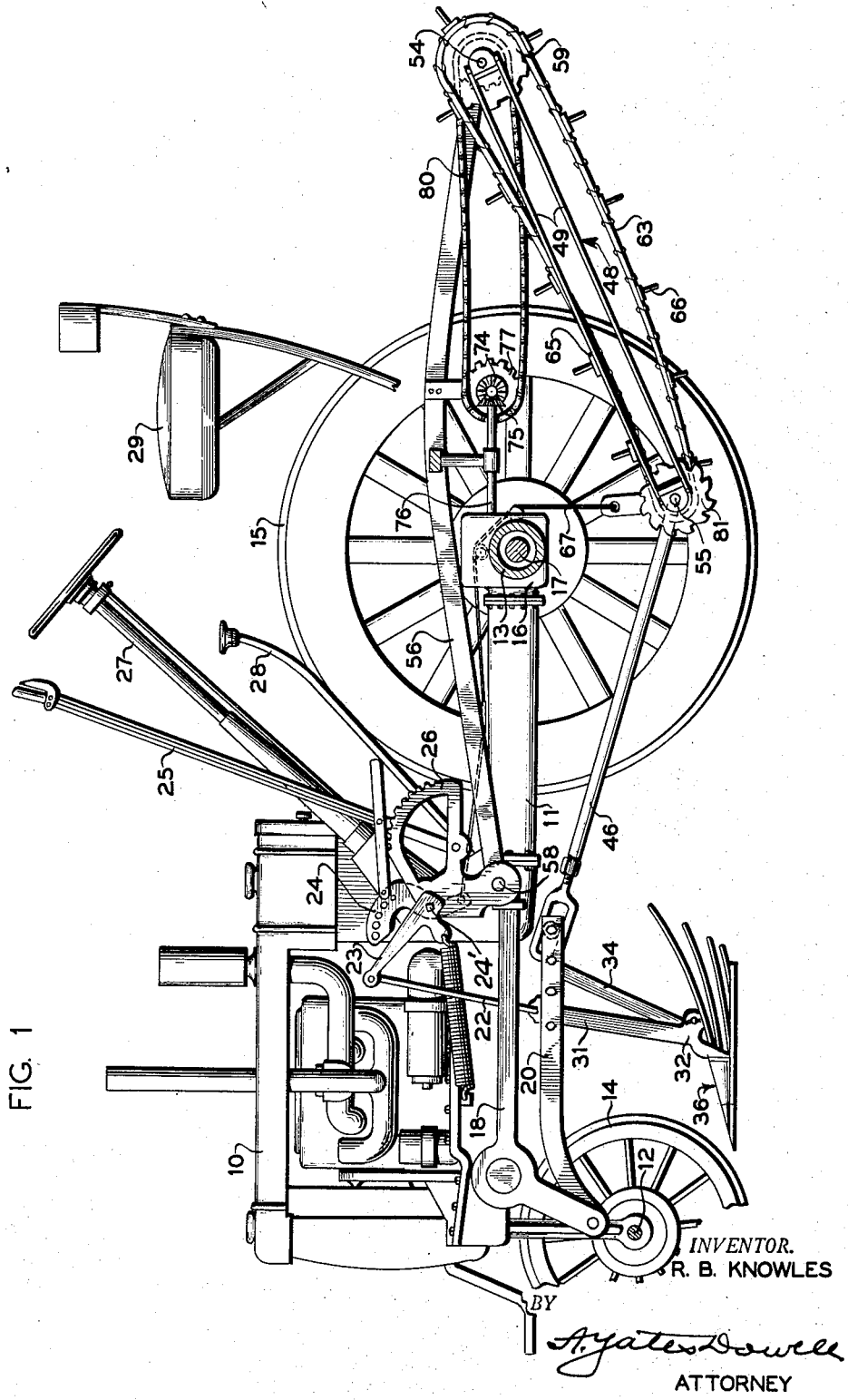

Oct. 3, 1950     R. B. KNOWLES     2,524,109
PEANUT DIGGER
Filed April 8, 1946     2 Sheets-Sheet 1

INVENTOR.
R. B. KNOWLES
BY
A. Yates Dowell
ATTORNEY

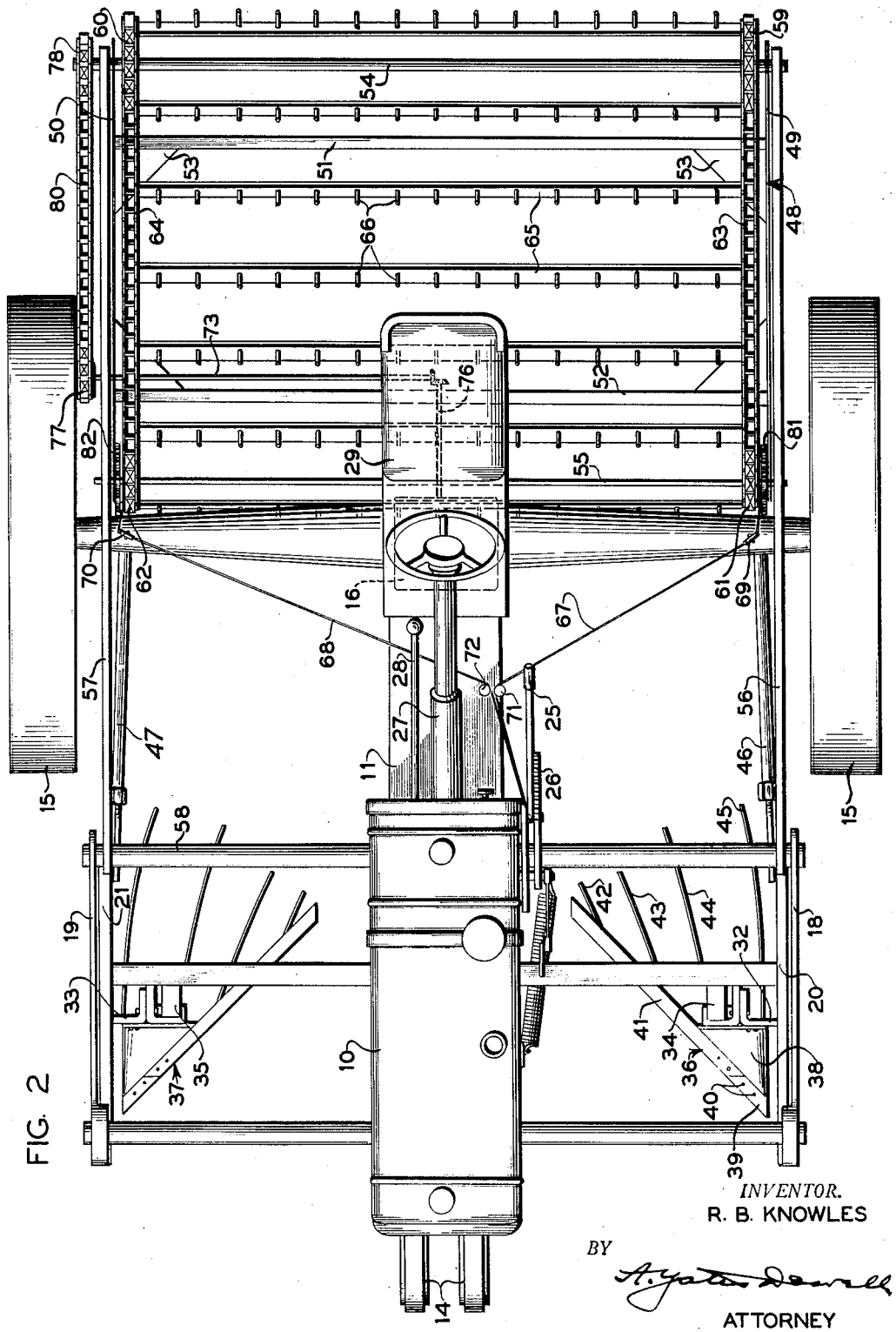

Patented Oct. 3, 1950

2,524,109

UNITED STATES PATENT OFFICE 2,524,109

PEANUT DIGGER

Russell B. Knowles, Windsor, N. C.

Application April 8, 1946, Serial No. 660,524

4 Claims. (Cl. 55—134)

This invention relates to improvements in harvesting machinery and particularly to machinery for harvesting underground crops such as peanuts, and is a continuation-in-part of my prior application Serial No. 551,730, filed August 29, 1944, now Patent 2,466,113 granted April 5, 1949.

A large number of devices have been previously proposed for providing peanut digging equipment in combination with an ordinary farm tractor. These previously proposed devices, in general, however, have been unnecessarily expensive and complex in construction and have not provided entirely satisfactory operation. They have, as a rule, required additional supporting wheels, and many of them have been provided as separate vehicles to be connected to the tractor, making the operation of the tractor in turning and backing extremely difficult. As the machine must be turned and realigned each time it comes to the edge of the field or planted area, loss of time and unnecessary effort in turning and realigning the machine presents a serious problem. In those cases where separate supporting wheels have not been used modification of the tractor itself has been resorted to as by providing extensions on the tractor axles or changing the clearance between one or both of the tractor axles and the ground necessitating the use of extra drive gears and materially affecting the operation of the tractor.

The device of my previous application requires no material modification of the tractor and has proved to be entirely satisfactory in operation. I have found, however, that it is unnecessarily heavy, complicated, and expensive and that entirely satisfactory results can be obtained with a simplified machine. I have discovered particularly that it is not necessary to provide a separate elevator for each row of peanuts but that at least two rows can be handled by a single elevator of convenient size provided the elevator is properly located and suitable means are provided for directing the peanut vines to it.

It is therefore an object of the present invention to provide improved peanut digging equipment for installation on a conventional farm tractor without necessitating any material modification of the tractor, the equipment being of simple construction, light in weight and inexpensive to manufacture.

A further object resides in the provision of improved peanut digging equipment for installation on a conventional farm tractor wherein a single elevator of convenient size is arranged to handle at least two rows of peanut vines and is entirely adequate to handle either the bunch or the vining variety of peanuts.

A still further object resides in the provision of improved peanut digging equipment for installation on a conventional farm tractor wherein the digging elements are provided with replaceable parts and are arranged to dig at least two rows of peanuts and direct them to a single elevator.

Other objects and advantages will be more particularly pointed out hereinafter or will become apparent from a consideration of the following description taken in conjunction with the accompanying drawings and the appended claims.

In the drawings:

Fig. 1 is a side elevational view of a farm tractor showing peanut digging equipment in accordance with the invention installed thereon; and Fig. 2 is a top plan view of the tractor and peanut digging equipment shown in Fig. 1.

With continued reference to the drawings, the tractor has a power plant 10 mounted on a frame 11 supported at the opposite ends thereof on a front axle 12 and a rear axle 13. The front axle is carried by closely spaced front wheels 14 and the rear axle by widely spaced rear wheels 15 of large diameter to which power is supplied from the power plant through the differential mechanism 16 and axle shafts 17. Supports 18 and 19 are secured to the frame 11 one at each side thereof and are provided at their forward ends with depending arms to which are pivotally secured respective cultivator attachment bars 20 and 21. The front ends of the attachment bars are pivotally connected to the lower ends of the support arms and intermediate its length each bar is connected with elevating mechanism including the link 22, arms 23 and 24, and lever 25 and tooth sector 26 so that the plow or cultivator blades supported on the attachment bars may be manually raised and lowered. The arm 23 is operatively connected to arm 24 by a shaft 24' suitably mounted on the tractor thereby coupling these parts together for simultaneous operation.

The tractor is also provided with a conventional steering means 27, speed changing means 28 and an operator's seat 29.

The above-described construction constitutes a conventional farm tractor, the arrangement of which is not materially modified in the installation thereto of the improved peanut digging equipment to be presently described.

Respective struts, as indicated at 31 in Fig. 1, depend from the intermediate portion of each attachment bar and these struts carry at their lower ends, bracket devices 32 and 33 to which suitable plow or digger blades are connected. Digger blades, generally indicated at 36 and 37, are attached to the corresponding brackets in position such that each follows a corresponding row of peanuts.

As the two digger blades are similar in construction and arrangement except that one is left hand and the other is right hand, a detailed description of the blade 36 is believed sufficient for the purpose of this disclosure. This blade has a base or supporting portion 38 rigidly connected to the bracket 32 and to which is connected a replaceable point 39 by suitable means such as the two bolts 40. A blade extension 41 is also connected to the base 38 and extends inwardly of the tractor from the point 39. Connected to the base 38 and blade extension 41 are a plurality of prongs or fingers 42, 43, 44, and 45 of gradually increasing length in the order stated. When the point and blade extension pass through the ground beneath the peanuts, uprooting them from the ground, the fingers 42 and 45 inclusive, catch the uprooted vines and roll them inwardly of the tractor to form a windrow beneath the tractor substantially centered relative to the tractor width.

Tension rods 46 and 47 extend rearwardly from the rear ends of the respective attachment bars 20 and 21, to which they are connected by lost motion joints, to pivotal connections with the corresponding sides of the front end of an elevator frame, generally indicated at 48. The frame may comprise suitable side members 49 and 50 and transverse members 51 and 52 connected to the side members, and the frame may be reinforced for strength and rigidity by suitable corner braces which may be in the form of gusset plates 53.

A shaft 54 is journalled in the frame near its rearward end and a similar shaft 55 is journalled in the frame near its forward end. The front end of the frame is positioned below and slightly to the rear of the tractor rear axle 13 by the rods 46 and 47 and the rearward end of the frame is positioned to the rear of and slightly above the tractor rear axle by suitable supporting beams 56 and 57 which extend rearwardly from the transverse support member 58, secured to the tractor frame, to the rearward end of the elevator frame 48.

The shaft 54 is provided adjacent its ends with chain sprockets 59 and 60 and the shaft 55 is provided with corresponding sprockets 61 and 62. The sprockets 59 and 61 carry an elevator end chain 63 while the sprockets 60 and 62 carry a corresponding chain 64. Between the chains 63 and 64 the elevator comprises a plurality of uniformly spaced bars or slats 65 preferably having upstanding teeth 66 spaced lengthwise thereof.

The front end of the elevator frame is arranged to be manually raised and lowered with the digging blades 36 and 37 and a suitable connection with the manual blade elevating means is provided for this purpose. In the arrangement shown, a pair of cables 67 and 68 have their ends connected to the corresponding sides of the front end of the elevator frame and are brought over respective sheaves 69 and 70 secured on the top of the tractor rear axle and past additional sheaves 71 and 72 secured on the tractor frame to an operative connection with a depending portion of the arm 24 so that when the manual lever 25 is moved to elevate the digger blades the front end of the elevator will be simultaneously raised.

When the blades and the front end of the elevator are lowered to operative position and the elevator is driven by a suitable drive mechanism, the peanuts uprooted by the blades will be picked up by the elevator and raised above the ground, most of the soil clinging to the peanuts being shaken off during this operation so that the peanut vines with peanuts attached thereto will be deposited on the top of the ground in a free condition and substantially free of adhering soil. If desired, a suitable collecting table or other means may be attached to the rear of the elevator to pile the peanut vines at convenient intervals for loading onto a transporting vehicle. Such a piling means is clearly shown in my prior application referred to above.

A means indicated for driving the elevator comprises a shaft 73 mounted transversely of the tractor above and somewhat to the rear of the rear axle 13 and operatively connected through suitable gears 74 and 75 with a power take-off shaft 76 extending from the tractor differential 16, a chain sprocket 77 on shaft 73, a corresponding chain sprocket 78 on shaft 54 and a drive chain 80 connecting the sprockets 77 and 78.

In order to completely separate the uprooted vines from the vines still rooted in the ground, cutter wheels 81 and 82 are secured on the shaft 55 adjacent the frame side members 49 and 50. These cutter wheels may be provided as metal disks having blade-like teeth on the peripheries thereof and since they are rotated with the shaft 55, they will effectively and efficiently cut any entangling vines.

With this arrangement, whenever the tractor is driven the elevator will also be driven to pick the peanuts up from the ground, shake the adhering soil therefrom and deposit them back onto the ground in a free and comparatively clean condition.

The elevator is contained entirely within the tread of the tractor rear wheels without requiring any axle extensions or other modifications of the tractor and is so positioned that adequate clearance is provided between the front end of the elevator and the tractor rear axle when in its normal elevation. The elevator is of very simple construction comparatively small and light in weight. The blades 36 and 37 with the attached fingers are so arranged that the uprooted peanut vines are rolled toward the center of the machine and to a position in which they are easily picked up by the single elevator.

This provides an extremely simple, light weight and economical attachment which may be installed upon a conventional tractor without requiring modification of the tractor and which does not in any way interfere with operation of the tractor.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. Peanut digging equipment for installation on a conventional farm tractor comprising a pair of digger blades supported on said tractor between the tractor front and rear wheels and having means thereon for moving peanut vines inwardly toward the center of the tractor, and an elevator supported on and disposed to the rear of said tractor in position such that its front end is vertically movable and is disposed below and immediately to the rear of the tractor rear axle; tractor carried means for simultaneously raising said digger blades and the front end of said elevator and means driving said elevator.

2. A self propelled peanut harvesting machine comprising a power plant supported on front and rear wheels, a rear drive axle, a pair of pivotally mounted bars between the front and rear wheels disposed longitudinally of the vehicle, manually operable means for raising and lowering said bars; a separating blade depending from each bar; a digger blade secured to each bar and arranged to be raised and lowered by said manually operable means; a vertically movable elevator disposed to the rear of said drive axle with its front end below and immediately to the rear of said rear axle, means drivingly connecting the elevator with the power plant, and means operatively connecting the front end of the elevator with said manually operable means for raising or lowering said elevator when the digger blades are raised or lowered.

3. A self propelled peanut harvesting machine comprising a power plant supported on front and rear wheels, a rear drive axle, a pair of pivotally mounted bars disposed between said front and rear wheels and longitudinally of the machine; means manually operable to raise and lower said bars; a digger blade secured to each bar and arranged to be raised and lowered by said manually operable means, each digger blade comprising a supporting portion, a point detachably secured to the supporting portion, a blade also secured to the supporting portion and a plurality of fingers secured to the supporting portion and shaped to turn uprooted peanut vines of two adjacent rows toward each other; an elevator disposed at the rear of said machine with its front end below and immediately to the rear of said rear axle, means drivingly connecting the elevator with the power plant; and means operatively connecting the front end of the elevator with said manually operable means for raising or lowering the front end of the elevator when the digger blades are raised or lowered.

4. A peanut harvesting machine comprising a power plant supported on front and rear wheels, a rear drive axle, a pair of pivotally mounted bars, means manually operable to raise and lower said bars; a digger blade secured to each bar and arranged to be raised and lowered by said manually operable means; and an elevator disposed at the rear of said machine with its front end below and immediately to the rear of said rear axle to receive peanut vines uprooted by said digger blades; said elevator comprising a pair of supporting beams extending rearwardly from a support between the front and rear wheels over the rear axle, a rear shaft supported by said beams, a rod extending rearwardly from each pivotally mounted bar, a front shaft supported thereby, chain sprockets on each shaft, elevator side chains mounted on said sprockets, transverse slats connected at their ends to said side chains and means operatively connected between said power plant and one of said shafts for driving said elevator; and means operatively connecting the front end of said elevator with said manually operable means for raising and lowering the front end of the elevator.

RUSSELL B. KNOWLES.

REFERENCES CITED

The following references are of record in the file of this patent:

UNITED STATES PATENTS

| Number | Name | Date |
|---|---|---|
| 669,908 | Williams | Mar. 12, 1901 |
| 2,297,065 | McLendon | Sept. 29, 1942 |